April 4, 1950 C. NICOLLE 2,502,738
MACHINE FOR CLOSING COMPOUND PACKAGES
Filed Jan. 21, 1946 3 Sheets-Sheet 1

INVENTOR
Charles Nicolle
By Watson, Cole, Grindle & Watson
ATTYS

April 4, 1950            C. NICOLLE            2,502,738

MACHINE FOR CLOSING COMPOUND PACKAGES

Filed Jan. 21, 1946            3 Sheets-Sheet 2

INVENTOR
Charles Nicolle
By Watson, Cole, Grindle & Watson
ATTYS

April 4, 1950 C. NICOLLE 2,502,738
MACHINE FOR CLOSING COMPOUND PACKAGES
Filed Jan. 21, 1946 3 Sheets-Sheet 3
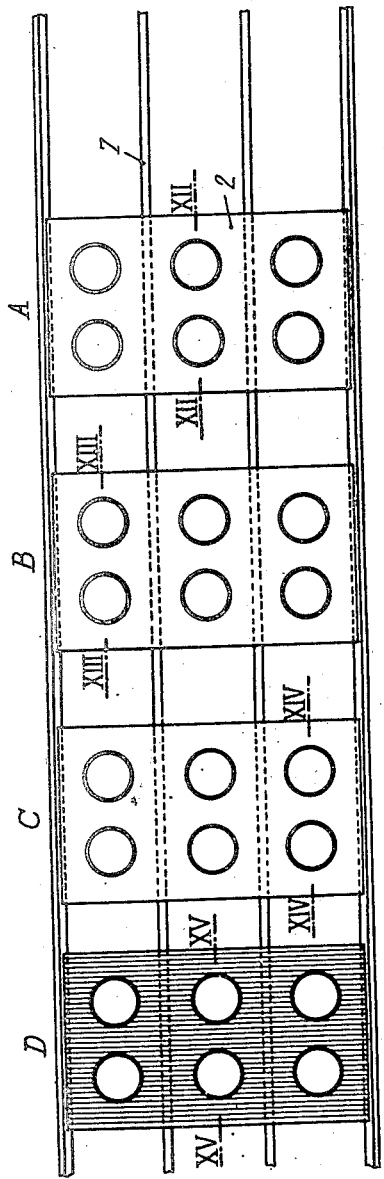
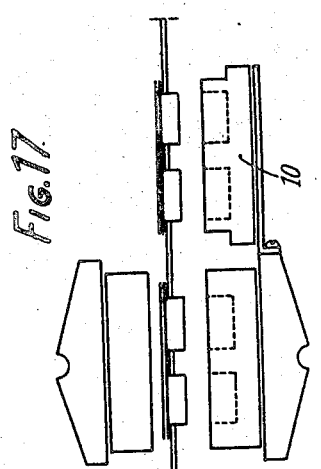
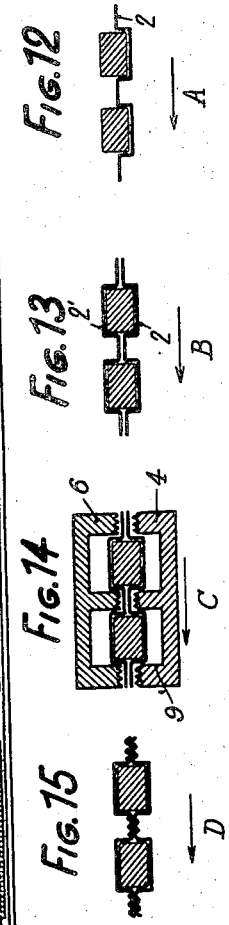
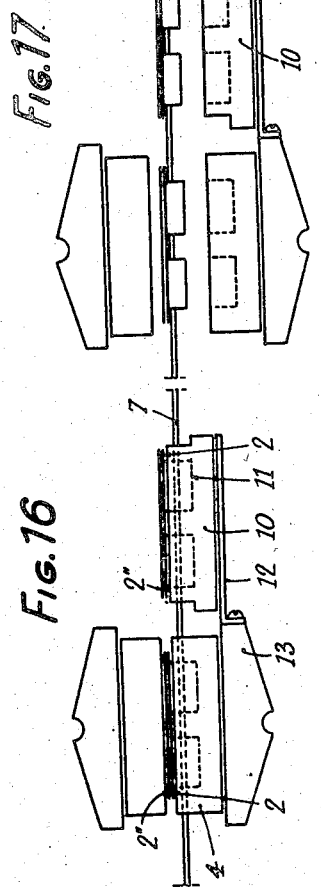
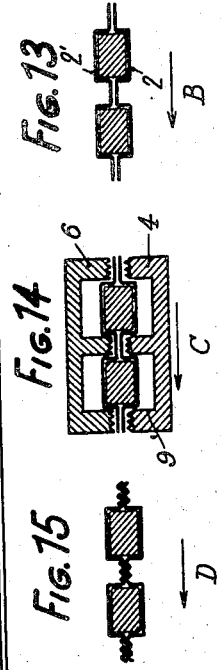
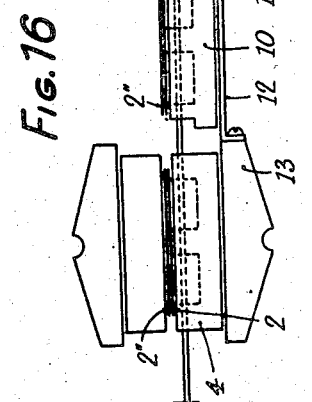

Patented Apr. 4, 1950

2,502,738

UNITED STATES PATENT OFFICE 2,502,738

MACHINE FOR CLOSING COMPOUND PACKAGES

Charles Nicolle, Gentilly, France

Application January 21, 1946, Serial No. 642,460
In France April 29, 1944

Section 1, Public Law 690, August 8, 1946
Patent expires April 29, 1964

7 Claims. (Cl. 226—2)

Recessed plates of cellulose acetate as used for the production of multicellular packages are generally obtained starting from sheets of this material the thickness of which is only a few hundredths of a millimeter and these sheets in spite of their resistance to tractional and tearing stresses are by reason of their small thickness too yielding to possess per se rigidity or steadiness.

Consequently, the handling and transportation of such recessed sheets during the operations of filling the recesses and of closing the packages are delicate and even difficult as when they are filled with the product to be packed and especially when their surface is somewhat considerable, said products are often brought to fall through the bending of the sheets which yield to the action of the weight of the products deposited in the recess. Of course it is possible to avoid this drawback by operating the loading directly on the very bottom die or mold of the machine adapted to close the packages, but the consequence thereof is a considerable loss of time and consequently a substantial reduction in yield as the package closing machine is inoperative during the whole duration of the filling.

It is therefore of interest to execute the filling of the recessed sheets outside the machine and to transfer them on to the machine in order to reduce to a minimum its time of inoperativeness, but this leads to the difficulties and drawbacks mentioned hereinabove.

Now my invention has for its object to remove these difficulties and drawbacks by providing for an easier transportation on to the package closing machine of the recessed sheets loaded outside said machine. To this end, I use according to my invention a carrier grate which is independent or not with reference to the package closing machine, said grate receding when required into grooves or channels formed in the bottom or sticking die, in order to avoid hindering the closing of said die.

In one of the forms of execution of the invention, the grate considered is independent of the package sticking or closing machine and the operations may follow one another in the sequence given out hereinafter.

a. The grate is laid for instance on an operating table near the machine.

b. Said grate is covered with a recessed sheet ready to be filled.

c. The recesses are filled with products to be packed, d. The filled sheet is covered with a second recessed sheet which latter is previously coated with glue or solvent in the case of such product being required for the closing operation or else the first sheet is already coated beforehand.

e. The loaded grate as obtained in accordance with the preceding paragraph is transferred onto the bottom or fastening die in order that the blades forming the grate may fit inside grooves provided between the rows of recesses of said die, said grooves being sufficiently deep for the blades forming the grate to fit inside them and to disappear entirely therein in order to avoid the compressional action of the two dies applied one against the other for fastening the package elements together.

f. The machine is closed in order that the fastening operation may be executed while in the meantime the operator may execute the loading of another grate similar to the grate considered.

g. When the adherence is obtained and the two dies are moved apart, the grate is raised so as to push upwards the finished package which is then released with reference to the lower die, after which the second grate which has been loaded in the meantime is inserted in the die and the press is closed again for a second operation and so on.

In a second form of execution of my invention, the grate forms part of the machine and is secured to the frame for instance. It extends beyond at least one side of the machine and preferably beyond both. The lower die for instance comprises as in the preceding case grooves inside which may recede the parts of the stationary grate comprised between the dies when the dies are moved towards one another for closing the multiple package.

With this form of execution, the procedure is similar to that described hereinabove with the difference however that for bringing to the machine the package after loading same on an outer portion of the grate, it is simply necessary to slide it over the latter part which is stationary and serves only as a carrier and a guideway. When the package is in place, the compression is executed as precedingly but at the opening of the machine, the lowering of the bottom die associated with the stationary grate produces the automatic extraction of the closed package which may then slide over the grate and be ejected.

In most cases, much time is spared with reference to the hand-operated removal method while affording the great advantage of removing the packages which are still hot and therefore soft at this stage of manufacture, while remaining perfectly flat instead of being deformed as often occurs when the removal out of the bottom die is executed solely by hand i. e. without any carrier grate.

According to a third form of execution, the two first forms are associated by providing independent grates forming carriages adapted to roll or to slide over suitable guide members projecting to one side at least beyond the machine and preferably through both.

Further features and advantages of my invention will appear from examination of the following description and inspection of accompanying drawings showing diagrammatically, solely by way of example and by no means in a limitative sense several forms of execution of my invention.

In said drawings:

Fig. 11 is a plan view showing the stationary grate of Figs. 9 and 10 with a certain number of packages carried on said grate.

Figs. 12, 13, 14, and 15 are cross-sections executed respectively through lines XII—XII, XIII—XIII, XIV—XIV, XV—XV of Fig. 11.

Figure 9:
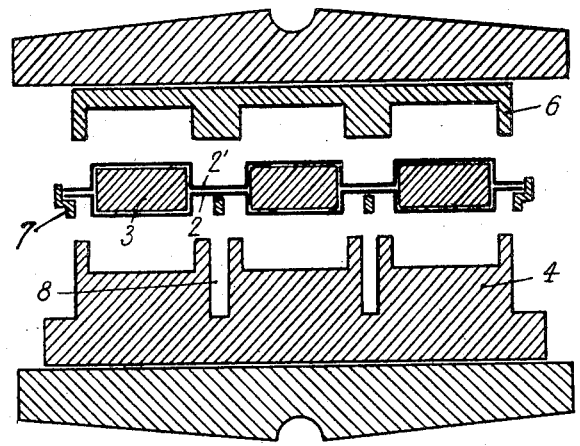
Figs. 9 and 10 are vertical cross-sections of a part of a machine for closing multiple packages, the bottom die being adapted to receive a stationary grate, receding therein.
Figure 10:
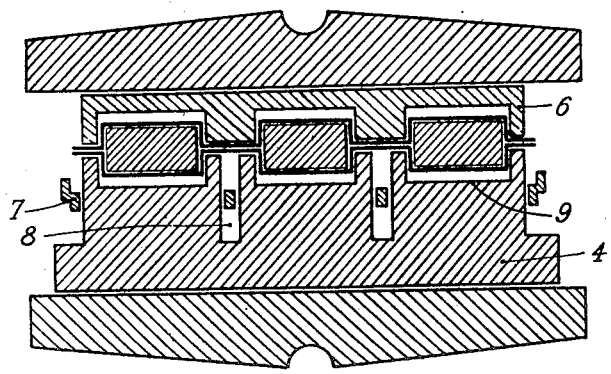

Figs. 16 and 17 show finally elevational views of two different positions of a modification of the package closing machine illustrated in Figs. 9 and 10.

As apparent in the drawings, I use in the form of execution of my invention illustrated in Figs. 1 to 8 a grate 1 for holding the recessed sheets or the multiple finished packages during their handling outside the machine. This grate 1 includes a certain number of bars between which may be inserted the recesses of the package sheets as apparent in Figs. 3 and 4 in particular.

Figure 1:
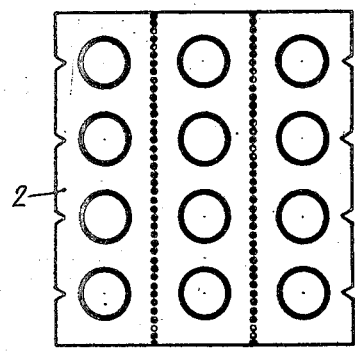
Figs. 1 and 2 are respectively plan and sectional views of one of the recessed sheets adapted for use in the formation of a multiple package of plastic material, the products to be packed being shown as contained in the recesses.
Figure 3:
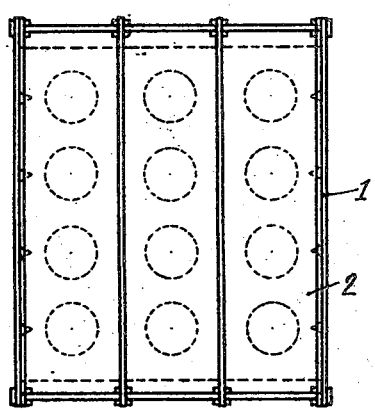
Figs. 3 and 4 are respectively a plan view and a cross sectional view of the grate used according to one of the forms of execution of the invention for holding recessed plates or sheets as illustrated in Figs. 1 and 2, while handling them outside the package closing machine.
Figure 2:
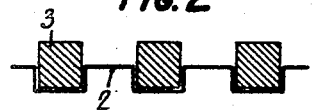
Figure 4:
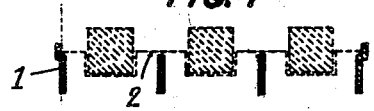
Figure 5:
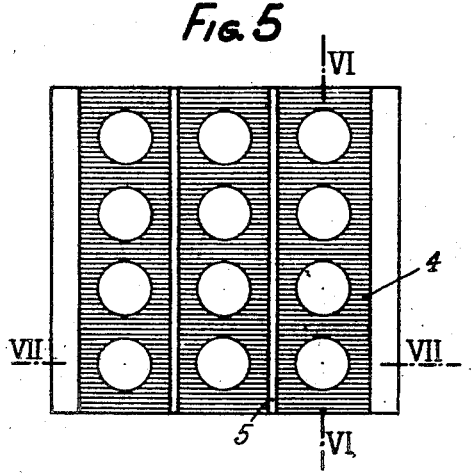
Fig. 5 is a plan view of the bottom die of the closing or fastening machine, said bottom die being used in association with the grate illustrated in Figs. 3 and 4.
Figure 6:
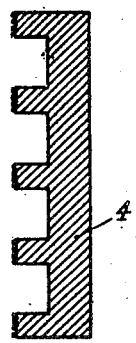
Figs. 6 and 7 are cross-sections respectively through lines VI—VI and VII—VII of Fig. 5.
Figure 7:
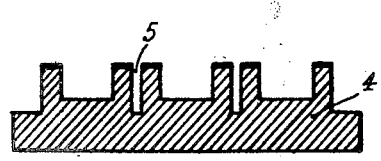

This recessed sheet 2 may be of the type illustrated by way of example in Figs. 1 and 2. Figs. 1 to 4 show that the bars of the grate 1 correspond substantially in a preferred form of execution and for the reasons given out hereinafter to the perforation lines which may be provided in a recessed sheet for separating the individual parts of the packages. This arrangement is however not essential. It is also possible to provide if required between two successive bars, instead of a single row of recesses two or more thereof, provided that when the recessed sheet 2 is carried on the grate and the products 3 are placed inside said recesses, said sheet may be sufficiently well held so that during transportation of this recessed sheet filled with the material to be packed into the closing machine, said material may not risk falling; moreover, at the moment at which the package is finished with its second sheet secured to the former in the closing machine the multiple package produced which is still hot should be capable of being removed without any risk of deformation or of damage.

Figure 8:
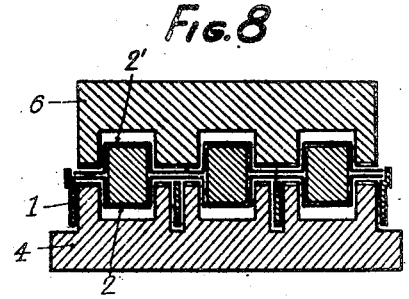
Fig. 8 is a cross section of two closing dies brought near one another, the grate of Figs. 3 and 4 having receded inside the bottom die.

The grate 1 is associated with a special bottom die 4 forming part of the package closing machine. This die is provided with grooves 5 which are sufficiently deep for the bars of the grate 1 associated with the bottom die to be entirely housed therein and to recede completely in said grooves when the two dies, to wit, the upper die 6 and the bottom die 4, are moved toward one another (Fig. 8). At this moment the grate 1 forms no hindrance whatever to the application of pressure against the flat portions of the recessed sheets 2, 2' which are to be joined together. A series of grates 1 should be available so that one of these grates may be used for the filling of a package while another grate is enclosed and held between the two dies during the closing operation of another package carried thereby. Thus no time is lost for the introduction of the package contents and the preparation of the package before closing as the time used for this operation does not take up any operating time of the machine.

The procedure under these conditions is that disclosed hereinabove which allows obtaining an excellent output for the closing machine without any risk of the objects or material packed falling out of the recesses during the transportation of the filled recessed sheets into the closing machine. Moreover the grate 1 allows when the package has been closed a very easy, very rapid rising in a perfectly flat manner of the finished sheets without any risk of deformation as would occur if the grate 1 were not available and if the still hot and consequently softened package 2—2' were to be removed directly by hand.

It should be noticed that the insertion of the grate 1 on the bottom die 4 may be made easier through suitable guiding means not illustrated. On the other hand the disengagement of the grate 1 may be rendered more or less automatic through a spring or catch system which may be secured to the upper die 6 or to the upper plate of the press carrying said die, whereby the mere opening of the press causes the rising of the package carrying grate. It is also possible to provide for automatic or semi-automatic ejecting means for the grate, making use of springs, levers or any suitable system located inside the bottom die.

Of course the grid instead of being executed as illustrated by way of example in the drawings may be constituted by mere metal rods, round for instance, if no considerable room is available for cutting the grooves or channels 5 inside the die 4. Moreover if possible I may provide one, two or more bars arranged transversely to the bars shown in Fig. 3 in which case the bottom die should comprise corresponding grooves inside which the transverse bars may recede. The grate 1 may be used to advantage in supporting the package at the filling station and in transferring the package, after it has been filled and the closing sheet has been applied, to the closing machine where it is acted upon by the closing dies 4 and 6. The filling station is independent of the package closing machine and may be located either at a distance or nearby and adjacent a suitable hand-operated or automatic distributor or other source of supply of the material that is to be packaged.

The grate 1 may also be associated with a loading and coating block or arrangement, said arrangement being more or less similar to the bottom die of the closing machine 4; said block is however independent of said machine and is adapted for use in coating the flat portions of the recessed plates by means for instance of a roller arrangement. This loading and coating block is particularly suitable in the case of deep recesses being used which are to be closed by shallow recesses lying in the same direction.

In front of the grate rods previously bearing against the flat portion of the packages, it is obvious that no sticking is possible as the upper die meets a hollow portion constituted by the groove or channel 5. This shows no drawback and it is possible to provide at these same locations separation lines, perforations or the like.

If however it is imperative to provide for sticking material at this place, it would be sufficient to provide accurately gauged bars designed in a manner such that they fill exactly the grooves 5; or else it is possible to provide a spring system inserted in the bottom die and transmitting a suitable pressure to these bars.

In Figs. 9 to 15, I have shown a further form of execution of the invention wherein the grate used as a support for the recessed sheets for multiple finished packages instead of forming an independent removable grate is a stationary grate forming part of the sealing machine or press. In this case the grate 7 is formed by a certain number of bars preferably rigid with the frame of the sealing machine and fitting inside grooves 8 provided in the bottom die 4 of the sealing machine when said die moves nearer the upper die 6 which may for instance be stationary. It is apparent by inspecting Figs. 9 and 10 that during the moving of the dies 4 and 6 towards one another the bottom die moves away from the grate 7, the system of the two recessed sheets 2—2' with the products 3 inserted therebetween. Thus the flat parts of the recessed sheets 2—2' are held tight between the corresponding portions of the two dies and they may be secured together through the usual means such as glue, solvent, heat, or a combination of these means with an eventual formation of striations on the flat portions. During this movement the grate 7 has completely disappeared inside the grooves 8 and consequently does not hinder by any means the applications of pressure to the flat parts of the two recessed sheets 2—2' which are thus reliably welded together.

When the time required for obtaining adherence has elapsed, I provide for the opening of the sealing arrangement, at which moment the bottom die sinks and releases automatically the grate; the finished packing is then during said sinking motion held back automatically by the grate and on it, in the same position as when starting. It is then sufficient to remove the finished package out of the machine.

In order to allow the filled recesses to be brought to the closing machine and their subsequent removal without any direct handling being necessary as such handling would lead to the drawbacks mentioned with reference to the first above described form of execution, the bars of the grate 7 are preferably extended to the outside of the machine preferably to both sides thereof through a length which is at least equal to the length of said grate inside the machine; as a matter of fact it will be more advantageous to give this outer part of the grate a more considerable length. This leads to the arrangement illustrated in Fig. 11. In said first station the lower recessed plate is carried by the grate at the first station illustrated at A and said lower recessed sheet 2 is filled at said station either by hand or through automatic loading means.

The filled sheet is then caused to slide over the grate 7 from the station A to the station B where the lower recessed sheet 2 receives the upper recessed sheet 2', said latter sheet being previously coated with solvent or glue throughout its flat or even surfaces through any suitable means. However in certain cases and in particular when packages are used which include a deeply recessed sheet covered with a sheet provided with shallow recesses set in the same direction, it is possible to coat with glue or solvent the flat parts of the lower recessed sheet 2 after which the sheet 2' is simply laid on the sheet 2 at the station A. These different operations are executed while the preceding package lies at the station C inside the sealing machine between the two dies 4 and 6 of the press. The dies are moved towards one another so as to tighten the flat elements of the recessed sheets 2—2' against one another. The bars of the grate 7 as explained hereinabove recede for this operation inside the grooves 8.

When the gluing or sealing operation executed at C is finished the two dies 4 and 6 are moved apart and the finished package is caused to slide along the grate 7 towards the station D where it cools slowly while the package lying previously at B is moved along the grate 7 to the station C and so on.

According to a further form of execution of the invention which has not been illustrated, it is possible, instead of sliding the recessed sheets directly over the bars of the grate 7, to move the latter together with the packages over auxiliary devices acting as small carriages adapted to move over suitable guiding means which may be located outside the machine, said auxiliary carriages being preferably removable so that they may be released when empty and returned to the filling station A.

It is also advantageous to provide stops which recede automatically for stopping and accurately inserting the recessed sheets between the dies, thus facilitating the registry of the recesses of the package with the corresponding recesses 9 provided to this end inside the dies used for the sealing operation and insuring that the recessed portions of the packages will automatically enter the recesses of the die.

The extensions of the grate 7 instead of being rectilinear as shown in Fig. 11 may be incurved through a certain radius in order to match the desired manner of operating in the vicinity of the machine. In particular, in the case where carriages are used for moving the recessed plates and their contents, the guideway for these carriages may form a closed curve so that the carriages when their packages have been removed may return automatically into their filling position and moreover the extensions of the grate 7 to the outside of the machine may eventually be sloping so as to allow the automatic progression of the loaded carriages.

Obviously instead of using a movable bottom die as illustrated in Figs. 9 and 10 while the upper die is stationary, the reverse arrangement may be adopted. In this case the grate would be associated with suitable springs and control or suspension members in order to allow the release of the grate out of the bottom die when the sealing machine is opened.

In the forms of execution illustrated in Figs. 16 and 17 the movable bottom die 4 is accompanied during its rising and sinking movement by a block 10 similar to the die 4 inasmuch as it also includes recesses 11 inside which the corresponding recessed portions of the lower recessed sheet are adapted to be received. The block 10 is carried by a support 12 suitably secured say to the lower plate 13 of the press carrying the bottom die 4. The block 10 finds a coating station; that is to say, when it is in its raised position it serves to support the lower recessed sheet so that the surfaces thereof between the recesses may be coated with a suitable adhesive or otherwise prepared for the subsequent closing operation. The cooperating cover sheet will be applied in registry with the lower recessed sheet at the coating station, so that the multicellular package is made entirely ready for the final closing or sealing operation at this stage.

This block 10 may also if desired be integral with the bottom die instead of being secured thereto.

In the example illustrated in Fig. 16, the package is constituted by a lower recessed sheet 2 and an upper flat sheet 2'. It might also be constituted by a deeply recessed sheet and by a sheet provided with shallow recesses of same direction. In Fig. 16, the machine is illustrated with the dies 4 and 6 in their closed or sealing position. Since the sealing operation requires a certain short time, the arrangement disclosed makes it possible during this interval to use the station defined by the block 10 as a sealing and assembly station. In other words, the lower recessed sheet is first laid upon the block 10, the material to be packaged is filled into the recesses thereof and the flat surfaces between the recesses are appropriately coated or otherwise treated to insure the desired adhesion of this sheet to the upper cover sheet when the assembly is brought between the closing or sealing dies. Finally, the upper or covering sheet 2'' is applied, whereupon the completely assembled package is ready to be slid along the grate bars 7 to the desired register position between the dies 4 and 6 when these shall have been opened and the sealed next preceding package is removed therefrom.

In Fig. 17 is illustrated the sealing press in its open position. This allows the sliding leftwards of the finished package and the prepared package lying on the grate 7 by reason of the lowering of the coating block or die 10 is brought into the machine with a view to its final closing and so on.

The sheets or packages adapted to be treated with the above described arrangements may be of any desired type. The latter are obviously not limited in their use to six-cell packages as illustrated in Fig. 11 or to 12-cell packages as illustrated in Figures 1 and 2. In fact the invention shows advantages which increase with increasing sizes of packages.

The above described arrangements illustrated in accompanying drawings may also be associated with any other arrangement and with other coating means and not only with those described with reference to Figs. 16 and 17. These arrangements may also be submitted to certain modifications in their details of execution without the general system according to the invention being modified thereby.

What I claim is:

1. A machine for closing multicellular packages made of two sheets of cellulose acetate or other similar plastic material, at least one of which sheets is recessed to receive the material to be packaged, and in which packages the two sheets are to be joined together in the zones thereof surrounding the material-receiving recesses, which comprises a lower die and an upper die cooperating therewith and adapted to be brought into opposed pressing engagement with said sheets along said zones thereof, and a grate for supporting said sheets between said dies, and said lower die having localized recesses in the face thereof for receiving interfitting bar portions of said grate when the two dies are in engagement.

2. A machine according to claim 1 wherein the grate is movable into and out of interfitting relation to the recesses of the lower die.

3. A machine according to claim 1 wherein the supporting grate extends beyond the confines of said dies on at least one side thereof and forms a slideway along which the multicellular package may be moved toward or away from the closing station between said dies.

4. A machine according to claim 1 wherein the grate is stationary and the lower die is raised to bring the localized recesses thereof into interfitting relation to the bar portions of said grate when said dies are brought into pressing engagement.

5. A machine according to claim 1 wherein the supporting grate extends beyond the confines of said dies at one side thereof and forms a slideway along which the multicellular packages may be moved from an assembly station to said dies, a supporting block having recesses in the face thereof for receiving interfitting bar portions of said grate, and means for moving said block into supporting position at said assembly station with said recesses in interfitting relation to the bars of said grate.

6. A machine according to claim 5 wherein means are provided for moving said supporting block into supporting position at the assembly station simultaneously with movement of the dies into closed position.

7. A machine according to claim 5 wherein the grate is stationary and the lower die is raised to bring the localized recesses thereof into interfitting relation to the bar portions of said grate when said dies are brought into pressing engagement, and the supporting block is connected to said lower die and movable therewith into and out of interfitting relation to the bars of said grate.

CHARLES NICOLLE.

REFERENCES CITED

The following references are of record in the file of this patent:

UNITED STATES PATENTS

| Number | Name | Date |
|---|---|---|
| 2,125,494 | Freeman | Aug. 2, 1938 |
| 2,126,861 | Altvater | Aug. 18, 1938 |